United States Patent [19]

Otto et al.

[11] Patent Number: 4,625,703
[45] Date of Patent: Dec. 2, 1986

[54] CRANKCASE VENTILATING SYSTEM, FLOW CONTROL DEVICE THEREFOR AND METHOD OF MAKING THE SAME

[75] Inventors: James A. Otto; Marvin P. Weaver, both of Knox County, Tenn.

[73] Assignee: Robertshaw Controls Company, Richmond, Va.

[21] Appl. No.: 720,876

[22] Filed: Apr. 8, 1985

[51] Int. Cl.⁴ .............................................. F02B 25/06
[52] U.S. Cl. ...................................... 123/574; 123/572
[58] Field of Search ......................... 123/572, 573, 574; 137/533.2, 543, 543.15, 480

[56] References Cited

U.S. PATENT DOCUMENTS

| | | |
|---|---|---|
| 228,493 | 6/1880 | Tyler . |
| 1,204,953 | 11/1916 | Davison . |
| 2,592,380 | 4/1952 | Beckett .................... 123/574 |
| 2,699,799 | 1/1955 | Wager ...................... 137/498 |
| 2,716,398 | 8/1955 | McMullen .................. 123/119 |
| 3,105,477 | 10/1963 | Lowther .................... 123/119 |
| 3,176,670 | 4/1965 | Sinibaldi ................... 123/572 |
| 3,198,208 | 8/1965 | Tramontini ................. 137/480 |
| 3,225,752 | 12/1965 | Robinson ................... 123/574 |
| 3,263,699 | 8/1966 | Givler et al. .............. 137/480 |
| 3,359,960 | 12/1967 | Pittsley .................... 123/119 |
| 3,439,703 | 4/1969 | Toda et al. ................ 137/480 |
| 3,503,417 | 3/1970 | Toda et al. ................ 137/480 |
| 3,581,721 | 6/1971 | Horiuchi ................... 123/574 |
| 3,662,724 | 5/1972 | Ohar ....................... 123/574 |
| 3,766,898 | 10/1973 | McMullen .................. 123/119 B |
| 3,958,603 | 5/1976 | Bannon et al. .............. 138/43 |

FOREIGN PATENT DOCUMENTS 660756 4/1963 Canada ................... 123/574

*Primary Examiner*—Ronald H. Lazarus
*Attorney, Agent, or Firm*—Candor, Candor & Tassone

[57] ABSTRACT

A crankcase ventilating system for an internal combustion engine, a flow control device therefor and method of making the same are provided, the device comprising a valve housing having an inlet and an outlet and an annular valve seat therein intermediate the inlet and the outlet, a movable valve member disposed in the housing and having a body portion disposed on the inlet side of the valve seat and a generally frusto-conical flow metering portion for cooperating with the valve seat to control fluid flow therethrough, and a spring disposed in the housing and being operatively associated with the housing and the valve member to tend to urge the body portion of the valve member away from the valve seat, the valve member having fin structure adjacent the metering portion and on the outlet side of the valve seat that cooperates with the housing to tend to prevent vibration of the valve member during fluid flow through the valve seat.

16 Claims, 13 Drawing Figures

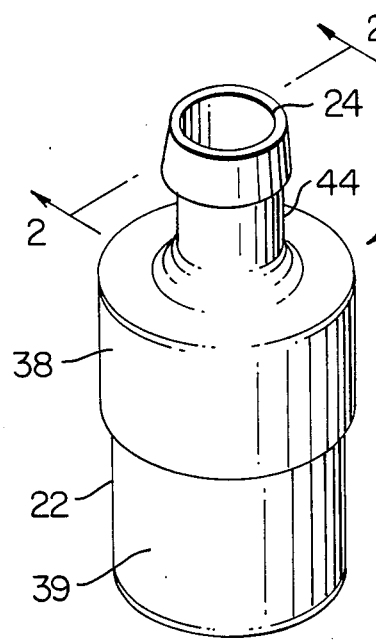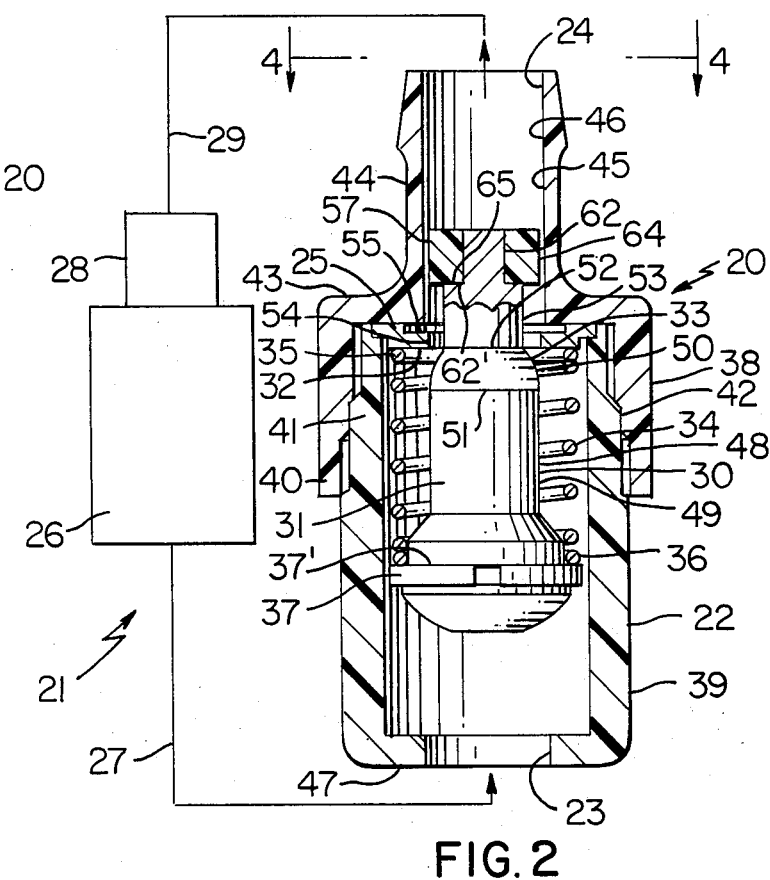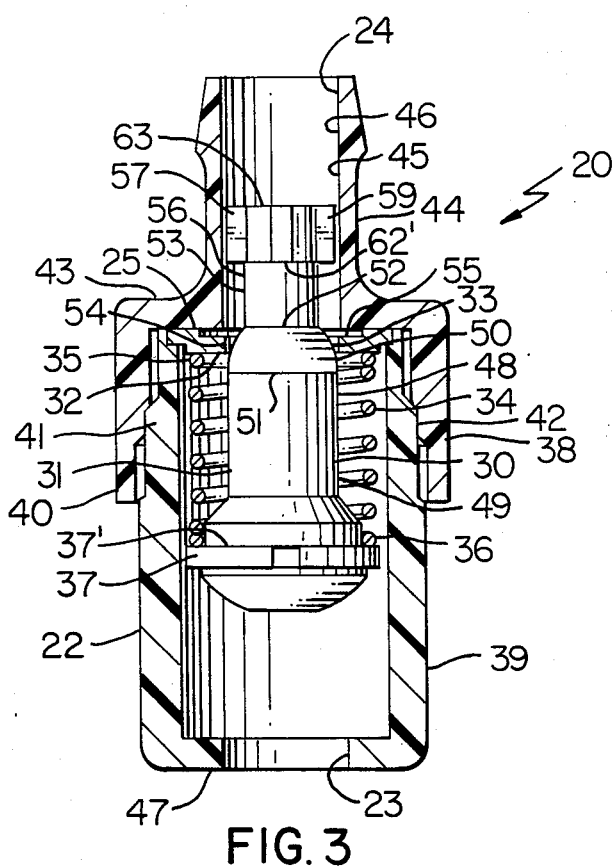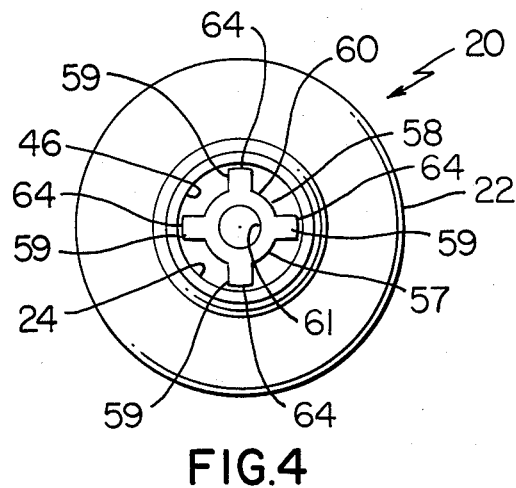
FIG. 1
FIG. 2
FIG. 3
FIG. 4

CRANKCASE VENTILATING SYSTEM, FLOW CONTROL DEVICE THEREFOR AND METHOD OF MAKING THE SAME

BACKGROUND OF THE INVENTION

1. Field of the Invention

This invention relates to a new crankcase ventilating system for an internal combustion engine and to a new flow control device therefor as well as to a new method of making such a flow control device.

2. Prior Art Statement

It is known to provide a crankcase ventilating system of an internal combustion engine wherein the system has a flow control device comprising a valve housing means having an inlet and an outlet and an annular valve seat means therein intermediate the inlet and the outlet, a movable valve member disposed in the housing means and having a body portion disposed on the inlet side of the valve seat means and a generally frusto-conical flow metering portion cooperating with the valve seat means to control fluid flow therethrough, and a spring means disposed in the housing means and being operatively associated with the housing and the valve member to tend to urge the body portion of the valve member away from the valve seat means. For example, see the Canadian patent to Willbrandt, No. 660,756; the U.S. Pat. No. 2,716,398, to McMullen; the U.S. Pat. No. 3,105,477, to Lowther; the U.S. Pat. No. 3,198,208, to Tramontini; the U.S. Pat. No. 3,263,699 to Givler et al; the U.S. Pat. No. 3,359,960 to Pittsley; the U.S. Pat. No. 3,439,703 to Toda et al; the U.S. Pat. No. 3,503,417 to Toda et al, and the U.S. Pat. No. 3,766,898 to McMullen.

It is also known to provide fin means on the stem means of a valve member. For example, see the U.S. Pat. No. 228,493 to Tyler; the U.S. Pat. No. 1,204,953, to Davison; the U.S. Pat. No. 2,699,799 to Wager, and the U.S. Pat. No. 3,958,603 to Bannon et al.

SUMMARY OF THE INVENTION

It is one feature of this invention to provide a new flow control device for a crankcase ventilating system of an internal combustion engine wherein the valve member thereof has means to tend to prevent vibration of the valve member during fluid flow through the valve seat means of the flow control device.

In particular, it is well known that it is desired to have a flow control device for a crankcase ventilating system of an internal combustion engine act within specified high and low limit curves for providing a flow of fluid from the crankcase of the engine to the carburetor intake of the engine, the flow rate being determined by the value of the vacuum being applied by the intake of the carburetor to the outlet of the flow control device.

However, it was found according to the teachings of this invention that it has been difficult to provide a flow control device that will act between such limit curves so as to provide a smooth acting flow control device because the valve member thereof tends to vibrate, oscillate or wobble and thereby provide a non-smooth flow rate curve. Also, such an oscillating valve member is a great noise generator with the noise often being heard inside the passenger compartment of a vehicle containing the internal combustion engine that utilizes the flow control device.

Accordingly, it was found according to the teachings of this invention that the tendency of the valve member of the flow control device to vibrate can be reduced if unique structure is provided on the valve member so as to coordinate with the housing of the control device on the outlet side of the valve seat thereof to tend to center the valve member relative to the valve seat.

For example, one embodiment of this invention provides a new flow control device for a crankcase ventilating system of an internal combustion engine, the device comprising a valve housing means having an inlet and an outlet and an annular valve seat means therein intermediate the inlet and the outlet, a movable valve member disposed in the housing means and having a body portion disposed on the inlet side of the valve seat means and a generally frusto-conical flow metering portion for cooperating with the valve seat means to control fluid flow therethrough, and a spring means disposed in the housing means and being operatively associated with the housing means and the valve member to tend to urge the body portion of the valve member away from the valve seat means, the valve member having fin means adjacent the metering portion and on the outlet side of the valve seat means that cooperates with the housing means to tend to prevent vibration of the valve member during the fluid flow through the valve seat means.

Accordingly, it is an object of this invention to provide a new flow control device for a crankcase ventilating system of an internal combustion engine, the flow control device of this invention having one or more of the novel features of this invention as set forth above or hereinafter shown or described.

Another object of this invention is to provide a new method of making such a flow control device, the method of this invention having one or more of the novel features of this invention as set forth above or hereinafter shown or described.

Another object of this invention is to provide a new crankcase ventilating system of an internal combustion engine utilizing such a flow control device, the system of this invention having one or more of the novel features of this invention as set forth above or hereinafter shown or described.

Other objects, uses and advantages of this invention are apparent from a reading of this description which proceeds with reference to the accompanying drawings wherein:

BRIEF DESCRIPTION OF THE DRAWINGS

FIG. 1 is a perspective view of one embodiment of the new flow control device of this invention.

FIG. 2 is an enlarged cross-sectional view taken on line 2—2 of FIG. 1, FIG. 2 also schematically illustrating the crankcase ventilating system of this invention.

FIG. 3 is a view similar to FIG. 2 and illustrates the flow control device in a fluid flow metering condition thereof.

FIG. 4 is a top view of the flow control device of FIG. 1 and is taken in the direction of the arrows 4—4 of FIG. 2.

DESCRIPTION OF THE PREFERRED EMBODIMENTS

Figure 5:
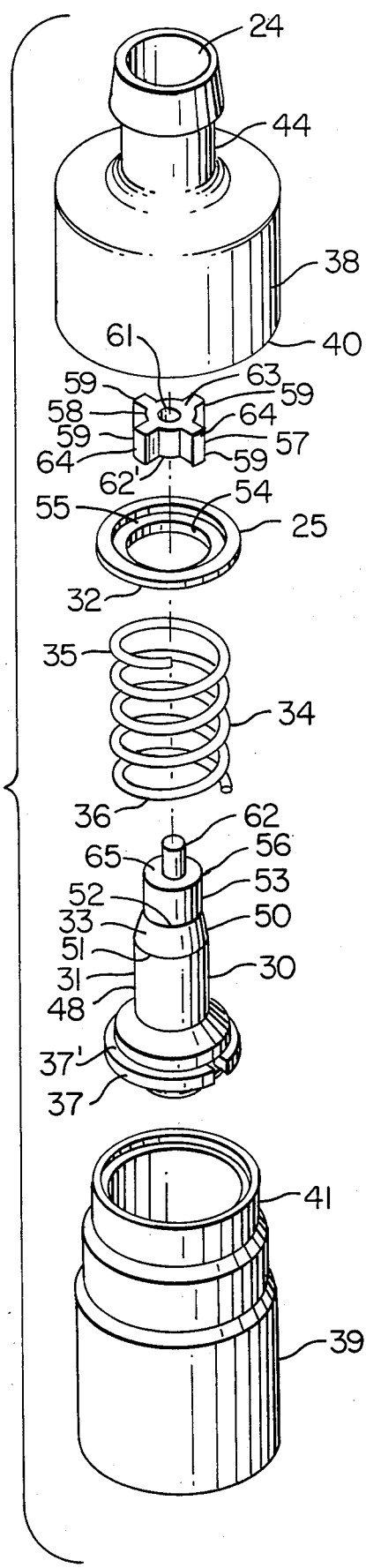
FIG. 5 is an exploded perspective view of the various parts of the flow control device of FIGS. 1-4.

While the various features of this invention are hereinafter illustrated and described as being particularly adapted to provide a flow control device for a crankcase ventilating system of an internal combustion engine, it is to be understood that the various features of this invention can be utilized singly or in various combination thereof to provide a flow control device for other systems as desired.

Therefore, this invention is not to be limited to only the embodiments illustrated in the drawings, because the drawings are merely utilized to illustrate one of the wide variety of uses of this invention.

Referring now to FIGS. 1-5, a new flow control device of this invention is generally indicated by the reference numeral 20 and is illustrated in FIG. 2 as being utilized in a crankcase ventilating system of this invention that is generally indicated by the reference numeral 21, the flow control device 20 having a housing means 22 provided with an inlet 23 and an outlet 24 and an annular valve seat means 25 therein intermediate the inlet 23 and outlet 24.

The system 21 comprises an internal combustion engine 26 of any suitable and conventional design and has its crankcase (not shown) fluidly interconnected to the inlet 23 of the device 20 by suitable conduit means 27. The engine 26 has a carburetor 28 of any suitable and conventional design and has its intake (not shown) interconnected to the outlet 24 of the device 20 by suitable conduit means 29.

The flow control device 20 has a movable valve member or poppet 30 disposed in the housing means 22, the valve member 30 having a body portion 31 disposed on the inlet side 32 of the valve seat means 25 and a flow metering or characterizing portion 33 for cooperating with the valve seat means 25 to control fluid flow therethrough in a manner well known in the art.

A spring means 34 is disposed in the housing means 22 and is operatively associated with the housing means 22 and the valve member 30 to tend to urge the body portion 31 of the valve member 30 away from the valve seat means 25 for a purpose well known in the art, the spring means 34 comprising a coiled compression spring having one end 35 bearing against the valve seat means 25 and the other end 36 thereof bearing against one side 37' of an annular flange means 37 provided on the body portion 31 of the valve member 30.

Since the general operation of a flow control device in a crankcase ventilating system similar to the flow control device 20 in the system 21 of this invention, is well known in the art as set forth in the aforementioned U.S. Pat. Nos. 2,716,398; 3,105,477; 3,198,208; 3,263,699; 3,359,960; 3,439,703; 3,503,417 and 3,766,898, these eight U.S. patents are being incorporated into this disclosure by this reference thereto.

The housing means 22 of the flow control device 20 comprises two cup-shaped housing members 38 and 39 respectively having open ends 40 and 41 telescoped and secured together in any suitable manner, such as by being ultrasonically welded together, adhesively secured together, etc., in the joint area 42 thereof. A closed end 43 of the cup-shaped housing member 38 has a tubular portion 44 extending therefrom and through which the outlet 24 is formed as a passage 45 that defines an internal peripheral surface 46 having a substantially circular transverse cross-sectional configuration. Likewise, a closed end 47 of the other cup-shaped housing member 39 has the inlet 23 formed therethrough in any suitable manner.

The annular valve seat means 25 is secured between the free end 41 of the housing member 39 and the closed end 43 of the housing member 38 as illustrated.

While the housing means 22 can be formed of any suitable material, the same can comprise plastic material, such as nylon.

Similarly, the valve member 30 and annular valve seat means 25 can be formed of any suitable material and in the embodiment illustrated in the drawings, the same are each formed of a low carbon steel, such as AISI 1010 low carbon steel.

The body portion 31 of the valve member or poppet 30 of the flow control device 20 has a substantially cylindrical section 48 provided with an external peripheral surface means 49 that defines a substantially circular transverse crosssectional configuration, the cylindrical section 49 joining with the metering portion 33 that is provided with an external surface means 50 that defines a substantially circular transverse cross-sectional configuration that reduces in diameter from the end 51 thereof to the other end 52 thereof. The end 52 of the metering portion 33 joins with a substantially cylindrical stem portion 53 of the valve member 30 that projects through a substantially circular opening 54 through the valve seat means 25 to be received in the outlet passage 45 on the outlet side 55 of the annular valve seat means 25, the stem portion 53 having an external peripheral surface 56 that defines a substantially circular transverse cross-sectional configuration.

The stem portion 53 of the valve member 30 of this invention carries unique structure or means that is generally indicated by the reference numeral 57 to cooperate with the internal peripheral surface means 46 of the housing means 22 on the outlet side 55 of the valve seat means 25 to tend to prevent vibration, oscillation or wobble of the valve member 30 during fluid flow through the valve seat means 25 by substantially centering the valve member 30 in the opening 54 of the valve seat means 25 as will be apparent hereinafter.

The means 57 of this invention comprises a part 58 having a plurality of circumferentially spaced apart fins 59 that radiate outwardly from a substantially cylindrical body portion 60 thereof that has an opening 61 passing centrally therethrough and receiving a reduced cylindrical part 62 of the stem portion 53 of the valve member 30 therein whereby the finned part 58 is carried on the valve member 30. The reduced end 62 of the stem portion 53 of the valve member 30 can be secured in the opening 61 of the finned part 58 in any suitable manner, such as by having the part 58 press-fitted thereon, adhesively secured thereon, etc.

The finned part 58 has opposed substantially flat sides 62' and 63 and each fin 59 has an outer end surface 64 which is substantially straight line in a longitudinal direction as illustrated in FIG. 2 and is arcuate in the circumferential direction thereof so as to correspond to the internal peripheral surface 46 of the housing means 22 while being disposed in slight spaced relation thereto as illustrated in the drawings in order to permit axial movement of the valve member in the housing means 22.

The reduced part 62 of the stem portion 53 of the valve member 30 defines an annular flat shoulder 65 against which one of the sides 62' or 63 of the finned part 58 can engage in the manner illustrated in the drawings and the finned part 58 can be so constructed and arranged that a flat free end surface 66 of the reduced part 62 of the valve member 30 can be disposed substantially flush with the other side 63 or 62' of the finned part 58 when the finned part 58 is disposed against the shoulder 65 as illustrated in the drawings.

While the finned part 58 can be formed of any suitable material, the same can be formed of plastic material, such as nylon and be the same material as the material of the housing means 22.

The operation of the flow control device 20 of this invention in the crankcase ventilating system 21 will now be described.

With the flow control device 20 of this invention disposed in the system 21 as illustrated in FIG. 2, the running of the engine 26 causes the carburetor 28 to create a vacuum in the line 29 that leads to the outlet 24 of the device 20 so that the vacuum draws fluid through the flow control device 20 and, thus, causes vapor from the crankcase of the engine 26 to be drawn through the conduit means 27 and the flow control device 20 into the intake portion of the carburetor 28 in a manner well known in the art, the rate of flow of the fluid through the valve seat means 25 being controlled by the position of the valve member 30 acting in opposition to the force of the compression spring 34 so as to position the tapering or metering portion 33 of the valve member 30 relative to the valve seat 25 in the manner illustrated in FIG. 3 so as to control the amount of flow of fluid through the flow control device 20 in relation to the valve of the vacuum being interconnected to the outlet 24.

Figure 12:
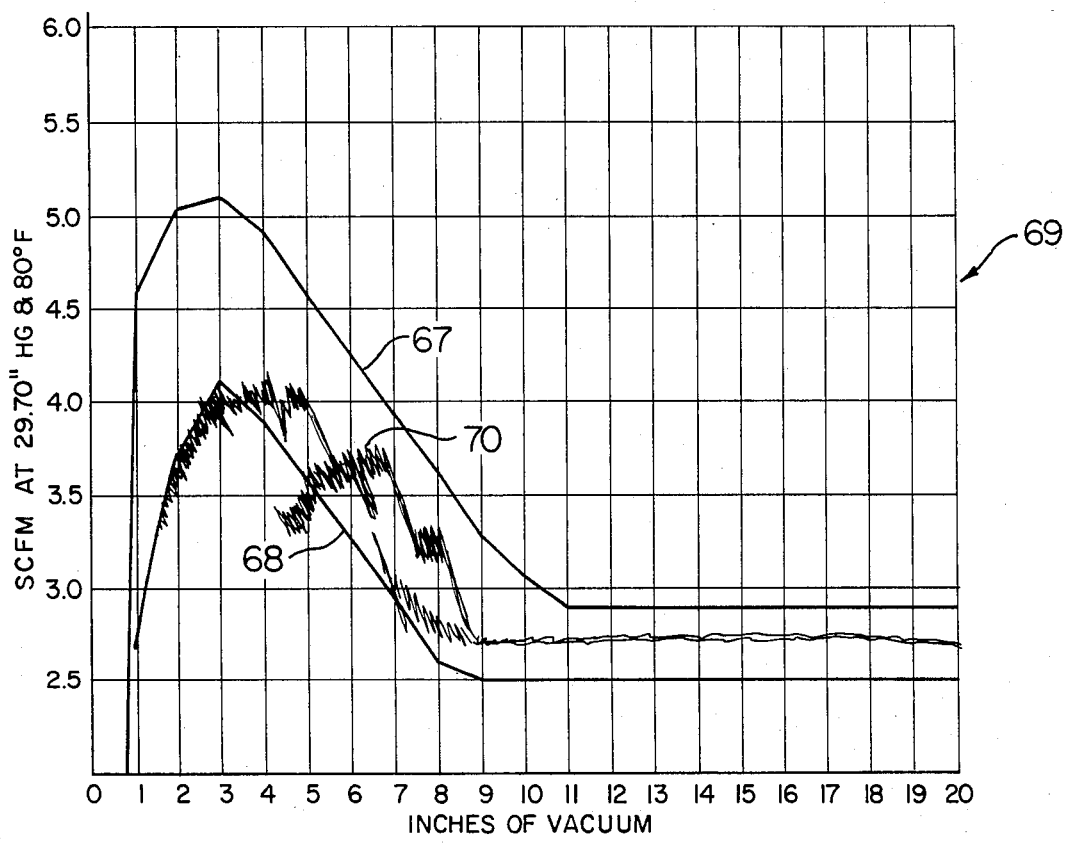
FIG. 12 is a chart illustrating the desired high and low limit curves for a particular flow control device and the actual performance curve of a flow control device which does not have the unique structure of this invention.

For example, the flow control device 20 is normally designed so as to ideally provide a flow of fluid therethrough in relation to the value of the vacuum of a particular system along a curve that is within high and low limit curves, such as the high and low limit curves 67 and 68 disposed on the chart or graph 69 of FIG. 12 wherein the X axis indicates inches of vacuum and the Y axis the air flow rate.

However, it was found according to the teachings of this invention that when the unique structure 57 comprising the finned part 58 of this invention is not utilized in the flow control device 20, the flow control device 20 tends to vibrate or wobble in the housing means 22 and thereby produces the erratic flow pattern or curve 70 illustrated in FIG. 12.

Figure 13:
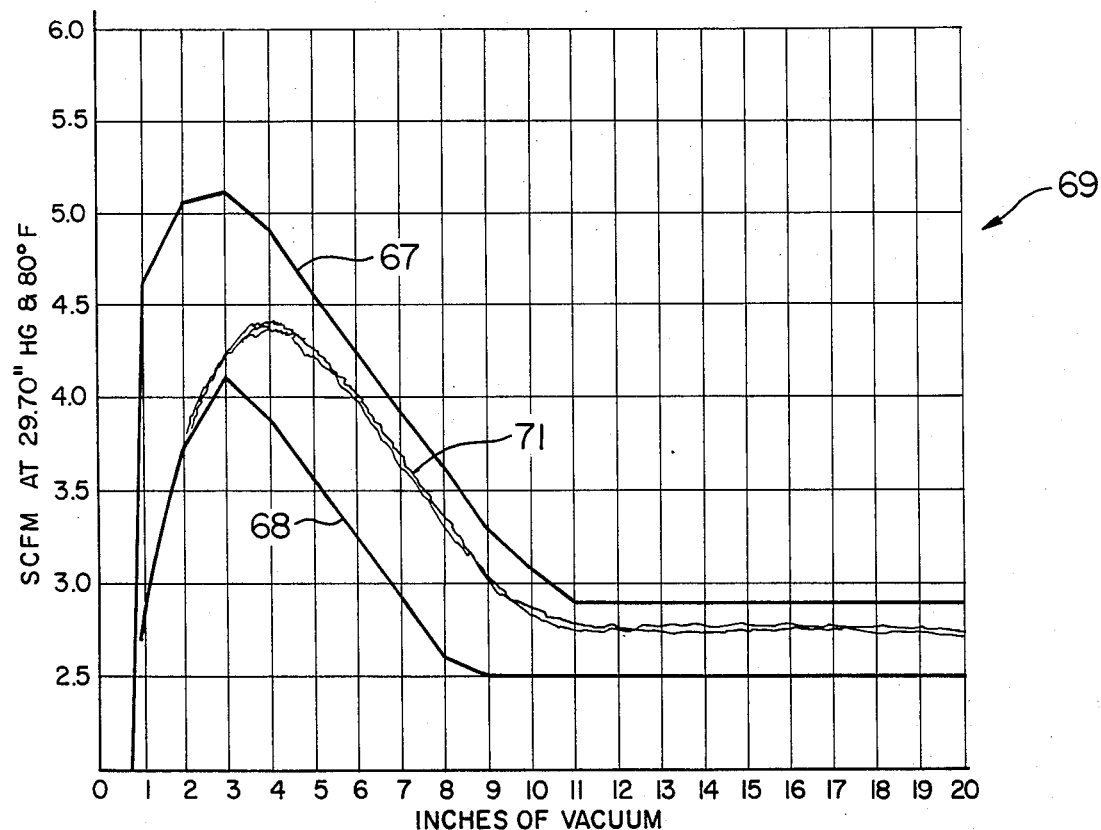
FIG. 13 is a chart similar to FIG. 12 and illustrates the actual performance curve of one of the flow control devices of this invention.

In contrast, when the flow control device 20 utilizes the finned part 58 of this invention in the manner previously described, the flow control device performs in the manner illustrated by the curve 71 in FIG. 13 whereby it can be seen that the curve 71 not only is disposed between the high and low limit curves 67 and 68 of the chart 69 of FIG. 12, but also the curve 71 does not indicate the large vibrations as in the curve 70 of FIG. 12.

Thus, it can be seen that by providing the finned part 58 of this invention on the outlet side 55 of the valve seat means 25 so as to be downstream from the valve seat means 25, the finned part 25 cooperates with the internal peripheral surface 46 of the housing means 22 to tend to keep the valve member or poppet 30 centered in the housing means 22 and thereby tenfds to eliminate the vibrations, oscillations or wobbling thereof which not only produces the performance curve 71 that is ideally confined within the specified limits 67 and 68 for good performance of the system 21, but also such reduced vibrations, oscillation or wobbling tends to eliminate adverse noise or chatter of the flow control device 20. Thus, even if a prior known flow control device performs between the curves 67 and 68 on the chart 69, such prior known flow control device may still be undesirable in that high vibrations of the valve member thereof will still produce adverse noise which might be eliminated if the prior known flow control device utilized the finned part 58 of this invention in the manner previously set forth.

While the flow control device 20 of this invention can be formed in any suitable manner by the method of this invention as previously set forth, there are times that the valve seat means or orifice plate 25 may have different internal diameters from one series of valves to another with some of the internal diameters being smaller than the internal diameter of the outlet passage 46 of the tube 44 downstream of that annular valve seat 25 so that the finned part 58 cannot pass through the opening 54 in such valve seat means 25.

Figure 6:
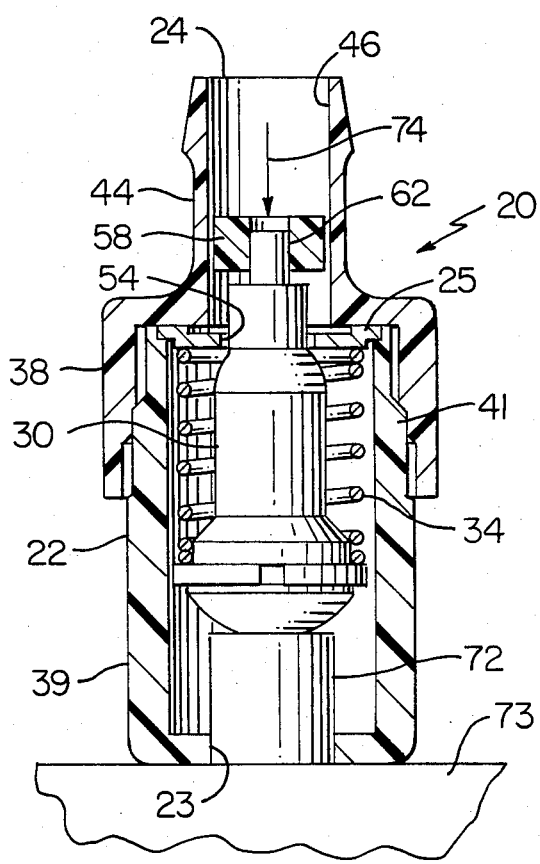
FIG. 6 is a view similar to FIG. 2 and illustrates one step in one method of this invention for making the flow control device of FIGS. 1-5.
Figure 7:
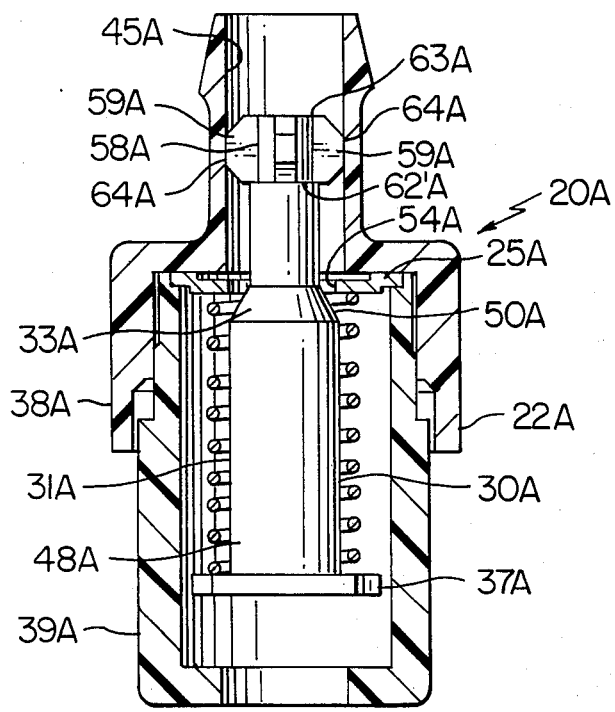
FIG. 7 is a view similar to FIG. 2 and illustrates another embodiment of the new flow control device of this invention.

Accordingly, a method of this invention for making such a control device 20 is illustrated in FIG. 6 wherein the control device 20 is completely assembled together except for the finned part 58. At this time the valve member 30 is disposed in such a manner that the same is supported on a stationary support 72 that extends from a supporting surface 73 through the inlet 23 so that the stem portion 53 projects through the opening 54 in the valve seat means 25 a sufficient distance to permit the finned part 58 to be inserted through the outlet 24 and be forced onto the reduced part 62 of the valve member 30 into the assembled condition thereof as represented by the force arrow 74 in FIG. 6.

Thus, it can be seen that the method illustrated in FIG. 6 permits a finned part 58 to be assembled onto the valve member 30 after the valve member 30 has been disposed in the housing means 22 and the housing members 38 and 39 have been secured together. Of course, if the diameter of the opening 54 of the valve seat means 25 is larger than the outside diameter of the finned part 58, the finned part 58 can be preassembled on the valve member 30 and the preassembled valve member 30 can be disposed in the open end 41 of the housing member 39 along with the spring means 34 and then the valve seat means 25 can be added with the housing member 38 then completing the assembly by being telescoped onto the housing member 39 and being secured thereto in any desired manner.

Another flow control device of this invention is generally indicated by the reference numeral 20A in FIGS.

7–11 and parts thereof similar to the flow control device 20 previously described are indicated by like reference numerals followed by the reference letter "A".

Figure 11:
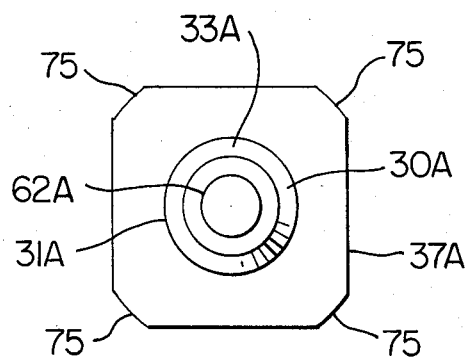
FIG. 11 is an end view of the valve member of FIG. 10 and is taken in the direction of the arrows 11—11 of FIG. 10.
Figure 10:
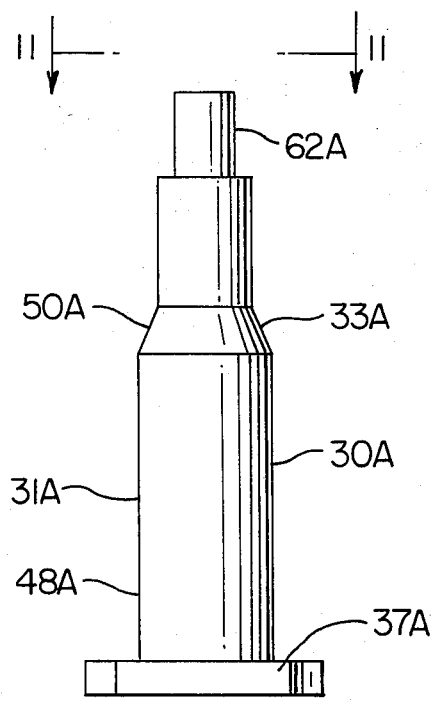
FIG. 10 is an enlarged view of the valve member of the flow control device of FIG. 7.

The flow control device 20A of FIGS. 7–11 is substantially the same as the flow control device 20 previously described except that the valve member 30A has the flange 37A thereof being substantially square with the corners 75 thereof being rounded and with the flange 37A being disposed at the end of the cylindrical portion 48A of the body portion 31A as illustrated in FIGS. 10 and 11. In addition, the tapering or metering portion 33A of the valve member 30A has the external peripheral surface 50A thereof defining a substantially straight line frusto-conical section whereas the external peripheral surface 50 of the tapering portion 33 of the valve member 30 defines a substantially convex or arcuate tapering structure.

Figure 8:
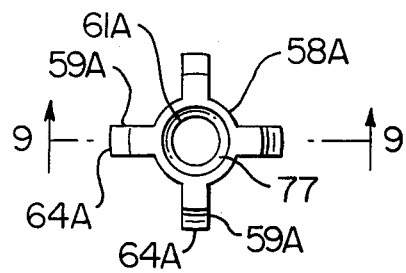
FIG. 8 is an enlarged end view of the fin means carried on the valve member of the flow control device of FIG. 7.
Figure 9:
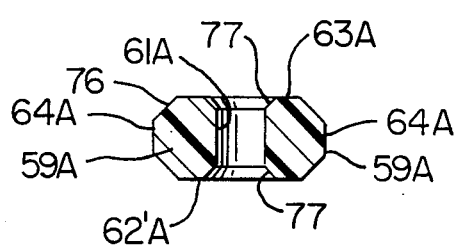
FIG. 9 is a cross-sectional view taken on line 9—9 of FIG. 8.

In regard to the finned part 58A on the reduced portion 62A of the valve member 30A, the same has outer sections 76 of each side 62'A and 63A of each fin 59A thereof tapering toward each other as they approach the outer peripheral surface 64A of the respective fin 59A as illustrated in FIGS. 8 and 9, the outer surface 64A of each fin 59A still being substantially straight line between the sections 76 in the longitudinal direction thereof while being arcuate in the circumferential direction thereof as illustrated in FIG. 8.

In addition, the opposed sides 62A and 63A of the finned part 58A of the flow control device 20A have inwardly tapering sections 77 that extend toward each other as the same approach the opening 61A passing therethrough in order to facilitate the insertion of the reduced part 62A of the valve member 30 into the opening 61A whereby the finned part 58A is adapted to readily be press-fitted onto the extension 62A of the valve member 30A in the manner previously set forth.

Since the operation of the flow control device 20A of this invention is substantially the same as the operation of the control device 20 previously described, the operation of the flow control device 20A of this invention will not be repeated.

However, because the present preferred embodiment of the flow control device of this invention is the flow control device 20A illustrated in FIGS. 7–10, the dimensions for one working embodiment of the flow control device 20A will now be set forth with the understanding that such dimensions are not to be a limitation on this invention.

In particular, one working embodiment of the flow control device 20A of this invention has the diameter of the opening 54A of the valve seat means 25A approximately 0.250 or 0.310 of an inch while the diameter of the outlet passage 45A of the housing means 22A is approximately 0.330 of an inch and the diameter defined by the outer surfaces 64A of the finned part 58A is approximately 0.315 to 0.320 of an inch. The distance between the opposed flat sides 62'A and 63A of the finned part 58A is approximately 0.150 of an inch, the sections 76 each make an angle of approximately 45° with the axis of the finned part 58A, the width of each fin 59A as illustrated in FIG. 8 is approximately 0.050 of an inch, the outside diameter of the body portion 60 is approximately 0.165 of an inch, and the diameter of the opening 61A is approximately 0.101 of an inch.

The overall length of the housing means 22A is approximately 1.390 to 1.410 inches while the outside diameter of the housing part 38A is approximately 0.875 of an inch, the outside diameter of the other cup-shaped housing part 39 is approximately 0.750 of an inch and the inside diameter of the housing part 38A is approximately 0.682 to 0.688 of an inch.

The valve member 30A for such a working embodiment of the control device 20A is approximately 1 and 3/16 ths inches in length with the length of the reduced part 62A being approximately 0.150 of an inch, the length of the flange 37A being approximately 0.060 of an inch, the length of the cylindrical portion 48A being approximately 0.595 of an inch, and the length of the metering or tapering portion 33A being approximately 0.070 of an inch. The diameter of the reduced part 62A is approximately 0.104 of an inch while the remainder of the stem 53A has a diameter of approximately 0.177 of an inch. The diameter of the cylindrical portion 48A is approximately 0.242 of an inch. Each side of the flange 39A is approximately 0.425 of an inch in length.

Therefore, it can be seen that this invention not only provides a new crankcase ventilating system of an internal combustion engine, but also this invention provides a new flow control device for such a system and a method of making such a flow control device.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the patent statute.

What is claimed is:

1. In a flow control device for a crankcase ventilating system of an internal combustion engine, said device comprising a valve housing means having an inlet and an outlet and an annular valve seat means therein intermediate said inlet and said outlet, a movable valve member disposed in said housing means and having a body portion disposed on the inlet side of said valve seat means and a generally frusto-conical flow metering portion for cooperating with said valve seat means to control fluid flow therethrough, and a spring means disposed in said housing means and being operatively associated with said housing means and said valve member to tend to urge said body portion of said valve member away from said valve seat means, the improvement wherein said valve member has fin means adjacent said metering portion and on the outlet side of said valve seat means that cooperates with said housing means to tend to prevent vibration of said valve member during said fluid flow through said valve seat means, said fin means extending outwardly from said valve member, said fin means comprising a plurality of spaced apart fins disposed in a circular array thereof and radiating outwardly from said valve member, said fin means comprising a separate part having an opening passing centrally therethrough, said valve member having a stem extending from said flow metering portion thereof and being disposed in said opening whereby said part is carried by said valve member.

2. A flow control device as set forth in claim 1 wherein said part is press-fitted onto said stem to provide for the securement therebetween.

3. A flow control device as set forth in claim 1 wherein said stem has an annular shoulder intermediate the ends thereof, said part being disposed against said shoulder to space said part from said flow metering portion of said valve member.

4. A flow control device as set forth in claim 1 wherein each fin has an outer edge means and opposed sides one of which faces toward said valve seat means, each side of each fin having an outer section thereof that is angled toward the other side thereof as the same approaches said outer edge means thereof.

5. A flow control device as set forth in claim 4 wherein said outer edge means of each fin defines an annular band surface having a substantially straight line transverse cross-sectional configuration, each outer section of each fin also defining a substantially annular band surface having a substantially straight line transverse cross-sectional configuration.

6. In a crankcase ventilating system of an internal combustion engine, said system having a flow control device comprising a valve housing means having an inlet and an outlet and an annular valve seat means therein intermediate said inlet and said outlet, a movable valve member disposed in said housing means and having a body portion disposed on the inlet side of said valve seat means and a generally frusto-conical flow metering portion for cooperating with said valve seat means to control fluid flow therethrough, and a spring means disposed in said housing means and being operatively associated with said housing means and said valve member to tend to urge said body portion of said valve member away from said valve seat means, the improvement wherein said valve member has fin means adjacent said metering portion and on the outlet side of said valve seat means that cooperates with said housing means to tend to prevent vibration of said valve member during said fluid flow through said valve seat means, said fin means extending outwardly from said valve member, said fin means comprising a plurality of spaced apart fins disposed in a circular array thereof and radiating outwardly from said valve member, said fin means comprising a separate part having an opening passing centrally therethrough, said valve member having a stem extending from said flow metering portion thereof and being disposed in said opening whereby said part is carried by said valve member.

7. A system as set forth in claim 6 wherein said part is press-fitted onto said stem to provide for the securement therebetween.

8. A system as set forth in claim 6 wherein said stem has an annular shoulder intermediate the ends thereof, said part being disposed against said shoulder to space said part from said flow metering portion of said valve member.

9. A system as set forth in claim 6 wherein each fin has an outer edge means and opposed sides one of which faces toward said valve seat means, each side of each fin having an outer section thereof that is angled toward the other side thereof as the same approaches said outer edge means thereof.

10. A system as set forth in claim 9 wherein said outer edge means of each fin defines an annular band surface having a substantially straight line transverse cross-sectional configuration, each outer section of each fin also defining a substantially annular band surface having a substantially straight line transverse cross-sectional configuration.

11. In a method of making a flow control device for a crankcase ventilating system of an internal combustion engine, said method comprising the steps of forming a valve housing means having an inlet and an outlet and an annular valve seat means therein intermediate said inlet and said outlet, disposing a movable valve member in said housing means so that a body portion thereof is disposed on the inlet side of said valve seat means and a generally frusto-conical flow metering portion thereof is adapted to cooperate with said valve seat means to control fluid flow therethrough, and disposing a spring means in said housing means so as to be operatively associated with said housing means and said valve member to tend to urge said body portion of said valve member away from said valve seat means, the improvement comprising the steps of forming said valve member with fin means adjacent said metering portion and on the outlet side of said valve seat means that is adapted to cooperate with said housing means to tend to prevent vibration of said valve member during said fluid flow through said valve seat means, forming said fin means to extend outwardly from said valve member, forming said fin means to comprise a plurality of spaced apart fins disposed in a circular array thereof and radiating outwardly from said valve member, forming said fin means to comprise a separate part having an opening passing centrally therethrough, forming said valve member to have a stem extending from said flow metering portion thereof, and disposing said stem in said opening in said part whereby said part is carried by said valve member.

12. A method of making a flow control device as set forth in claim 11 and including the step of press-fitting said part onto said stem to provide for the securement therebetween.

13. A method of making a flow control device as set forth in claim 12 wherein said step of press-fitting said part onto said stem takes place after said valve member has been disposed in said housing means.

14. A method of making a flow control device as set forth in claim 11 and including the steps of forming said stem to have an annular shoulder intermediate the ends thereof, and disposing said part against said shoulder to space said part from said flow metering portion of said valve member.

15. A method of making a flow control device as set forth in claim 11 and including the steps of forming each fin to have an outer edge means and opposed sides one of which faces toward said valve seat means, and forming each side of each fin to have an outer section thereof that is angled toward the other side thereof as the same approaches said outer edge means thereof.

16. A method of making a flow control device as set forth in claim 15 and including the steps of forming said outer edge means of each fin to define an annular band surface having a substantially straight line transverse cross-sectional configuration, and forming each outer section of each fin to also define a substantially annular band surface having a substantially straight line transverse cross-sectional configuration.

* * * * *